US005725104A

United States Patent [19]

Walraven

[11] Patent Number: 5,725,104

[45] Date of Patent: Mar. 10, 1998

[54] VALVE CONSTRUCTION FOR HIGH DENSITY PULP CLEANER

[76] Inventor: Gerald O. Walraven, 4029 Snake Island Rd., Sturgeon Bay, Wis. 54235

[21] Appl. No.: 711,959

[22] Filed: Sep. 6, 1996

Related U.S. Application Data

[63] Continuation of Ser. No. 330,429, Oct. 27, 1994, abandoned.

[51] Int. Cl.[6] .............................. B04C 5/14; F16K 31/44

[52] U.S. Cl. .............................. 209/733; 251/77; 251/78; 210/117

[58] Field of Search .............................. 209/208, 209, 209/725, 732, 733; 210/109, 112, 113, 114, 117, 512.1, 512.2, 512.3; 251/63.4, 77, 78, 319

[56] References Cited

U.S. PATENT DOCUMENTS

| | | | |
|---|---|---|---|
| 3,401,716 | 9/1968 | Gallogly | 251/78 X |
| 3,897,042 | 7/1975 | Kachergis | 251/77 |
| 3,942,757 | 3/1976 | Hansen et al. | 251/78 |
| 3,944,135 | 3/1976 | Kalinovski | 251/78 X |
| 4,224,959 | 9/1980 | Fling | 251/78 X |
| 5,273,647 | 12/1993 | Tuszko et al. | 209/733 X |

FOREIGN PATENT DOCUMENTS

| | | | |
|---|---|---|---|
| 38274 | 6/1956 | Germany | 209/733 |

OTHER PUBLICATIONS

"High Density Cleaner Efficiency Determined by Design Materials", Pulp & Paper, Aug. 1994, pp. 42–45.

*Primary Examiner*—Tuan Nguyen
*Attorney, Agent, or Firm*—Andrus, Sceales, Starke & Sawall

[57] ABSTRACT

An improved dump valve construction for a high density cellulosic pulp cleaner. The cleaner comprises an upper separating chamber and a lower reject chamber which communicates with the lower end of the separating chamber. Cellulosic pulp is pumped tangentially into the upper end of the separation chamber and is swirled within the separation chamber to cause the high density contaminants to fall into the reject chamber while the pulp is discharged through an outlet in the upper end of the separation chamber. The opening between the lower end of the separation chamber and the reject chamber can be opened and closed by a sliding upper valve while the lower end of the reject chamber is formed with an outlet and the flow through the outlet is controlled by a dump valve having a curved or spherical outer surface which seats on an annular valve seat bordering the outlet. The dump valve is moved between a closed and opened position by a fluid cylinder unit and the piston rod of the fluid cylinder unit is connected to the stem of the dump valve through a lost-motion connection.

17 Claims, 1 Drawing Sheet

FIG. 1
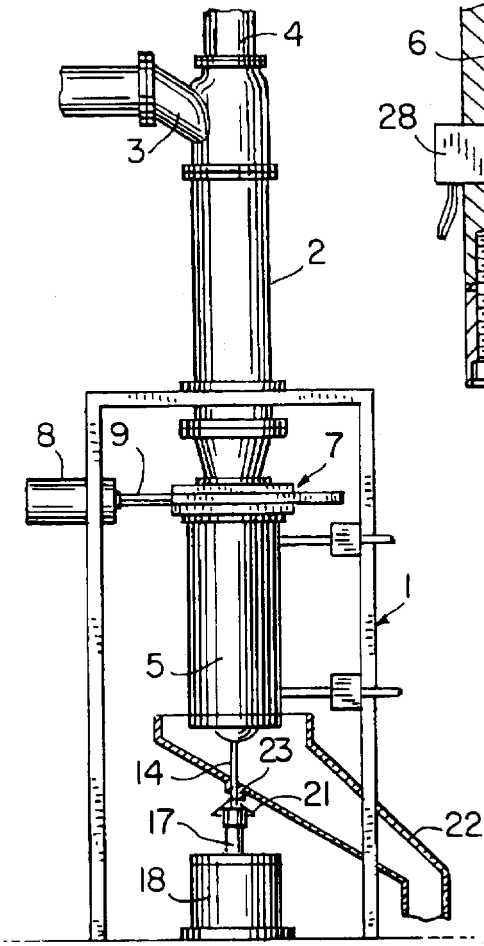
FIG. 2
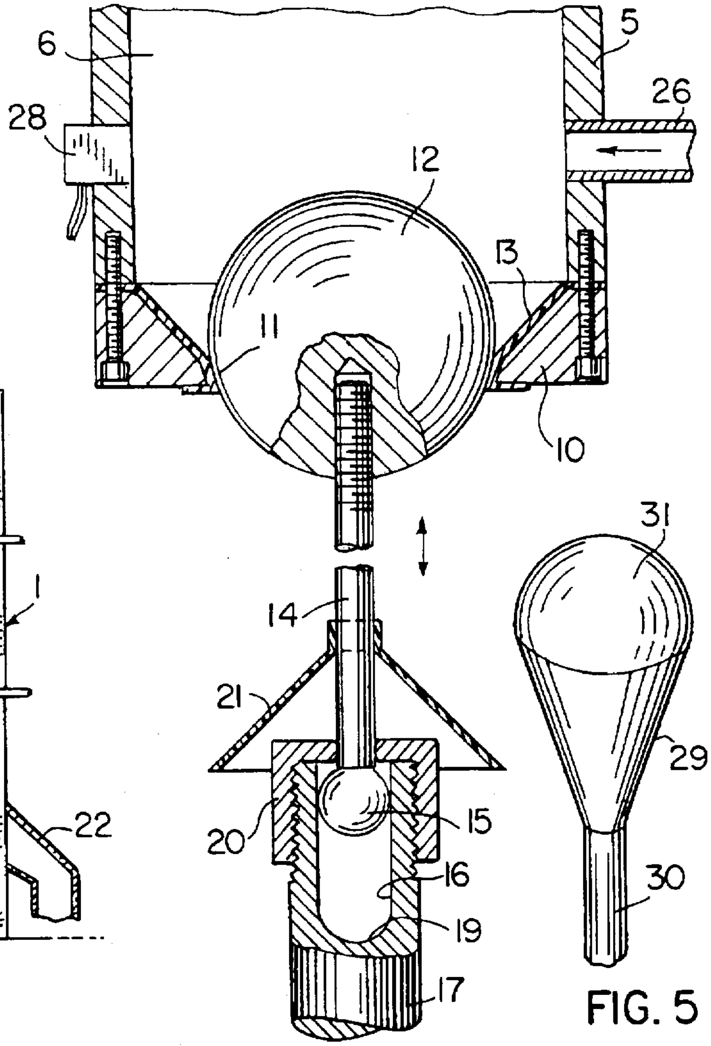
FIG. 5
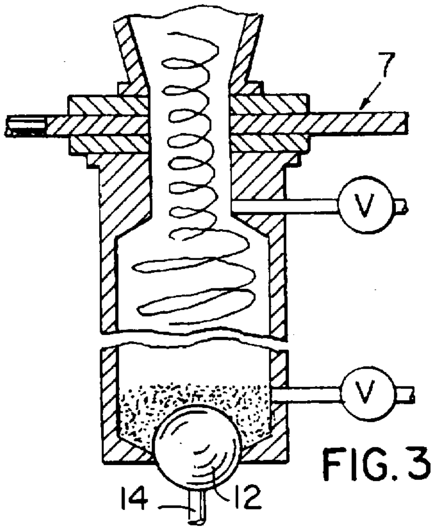
FIG. 3
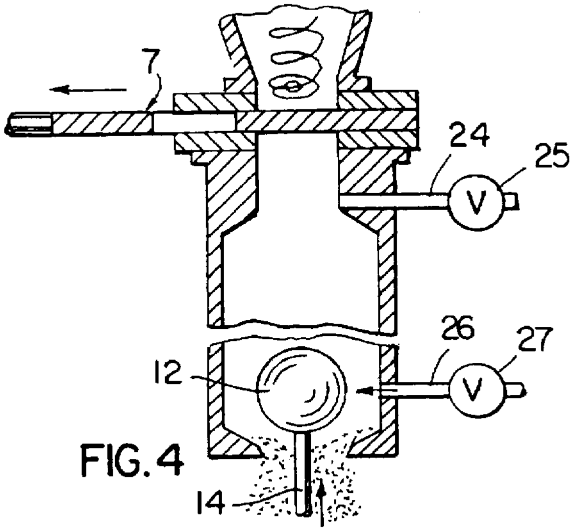
FIG. 4

VALVE CONSTRUCTION FOR HIGH DENSITY PULP CLEANER

This is a continuation of application Ser. No. 08/330,429, filed Oct. 27, 1994, now abandoned.

BACKGROUND OF THE INVENTION

High density cleaning of cellulosic pulp occurs immediately after pulping and serves to remove high and medium density contaminants from the pulp. With recycled pulp produced from old corrugated cartons or office waste, the high density contaminants can take the form of stones, staples, wire, bolts, nails, paper clips and the like, and it is essential to remove these materials prior to further processing of the pulp.

The typical high density cleaner is a vortex or cyclone type, in which the pulp at a consistency of about 2.5% to 5.5% by weight of solids is pumped into a tangential inlet at the upper end of the cleaner. The tangential entry design of the cleaner causes the pulp to rotate or swirl within the cleaner. As the pulp slowly rotates, shear planes are caused by acceleration of the pulp as it travels from the outside diameter of the cleaner radially inward toward the axis of rotation where it is then diverted upwardly through the vortex and discharged through an outlet in the upper end of the cleaner. The shear planes tend to strip high density particles from the pulp. In addition to the shear planes, the rotational motion results in extremely high centrifugal forces that cause the high density particles to migrate toward the outside of the cleaner. The high density particles then fall downwardly into a reject or collection chamber that communicates with the lower end of the separation chamber.

In a conventional cleaner, an upper sliding valve is located at the bottom of the vortex or separation chamber, while the lower end of the reject chamber is formed with an outlet which can be opened and closed by a second or lower sliding valve.

In normal operation of the vortex cleaner, the upper sliding valve is open while the lower sliding valve is closed, and as the pulp is pumped through the vortex chamber, the high density particles will migrate downwardly through the open upper valve into the reject chamber and be collected therein. Periodically, the collected solid contaminants in the reject chamber are discharged or dumped and to provide the dumping, the upper sliding valve is closed, the pressure is relieved within the reject chamber, and the lower sliding valve is then opened to permit the collected contaminants to be discharged. The reject chamber is then flushed with elutriation water to flush pulp and contaminants from the reject chamber. After the dumping cycle has been completed, the lower sliding valve is then closed, the reject chamber is pressurized, and the upper sliding valve is opened and the cycle is repeated.

A problem arises with the conventional vortex cleaner in the entrapment of debris or contaminants in the valve and valve seat of the lower sliding valve, resulting in excessive wear on the valve and seat and possible jamming of the valve. A similar problem does not arise with the upper sliding valve due to the fact that the upper sliding valve is closed only for a short interval, generally in the range of about 30 to 45 seconds, and the turbulence within the vortex chamber does not permit any appreciable settling of debris on the upper sliding valve during this time period.

SUMMARY OF THE INVENTION

The invention is directed to an improved dump valve construction for a high density vortex pulp cleaner. The vortex cleaner itself is of conventional construction, and includes an upper vortex or separation chamber and a lower reject chamber. The pulp slurry is pumped into the vortex chamber through a tangential inlet, causing the pulp to swirl or rotate within the vortex chamber. Shear planes are caused by acceleration of the pulp as it travels from the outside diameter of the vortex chamber radially inward toward the axis of rotation, and the shear planes tend to strip high density particles or contaminants from the pulp. After moving toward the axis of rotation in the vortex chamber, the pulp is discharged upwardly through the vortex center to an outlet in the top of the cleaner.

A conventional upper sliding valve is employed to open and close the opening between the lower end of the vortex chamber and the reject chamber, and the lower end of the reject chamber is formed with an outlet through which the collected contaminants are periodically dumped or discharged. An annular valve seat borders the outlet in the reject chamber, and in accordance with the invention, a spherical or frusto-conical dump valve is mounted for vertical movement within the reject chamber and is adapted to engage the valve seat to control the flow of material through the outlet. The valve seat is provided with a partially spherical or tapered surface to conform to and mate with the peripheral surface of the dump valve.

The dump valve is moved between the open and closed positions by a fluid cylinder unit, which is mounted beneath the cleaner. The piston rod of the fluid cylinder unit is connected to a rod or stem that is secured to the dump valve through a lost-motion connection. In this regard, the distal end of the stem of the valve carries a slide, preferably in the form of a ball, which is slidable within an axial recess in the outer end of the piston rod. Initial upward movement of the piston rod will cause the slide to move within the recess without corresponding movement of the dump valve. When the slide reaches the bottom of the recess, further movement of the piston rod will then be transmitted to the dump valve to open the valve. When the slide bottoms out, an impact or jarring action is achieved which aids in unseating the large dump valve.

The valve construction of the invention eliminates the problems associated with the use of sliding dump valves as used in the past, such as excessive wear on the valve and valve seats, and jamming of the valve.

When the valve of the invention is in the open upper position, a large opening exists to allow free passage of contaminants from the reject chamber with the flushing water. The peripheral surface of the valve as well as the valve seat, are curved or sloping and completely smooth so that there are no hang-up points or cracks for contaminants to engage and build up.

When the ball is in the closed position, the upper surface of the valve acts as a natural target to break the cyclone vortex and distribute the contaminants in the large annular area around the valve.

The dumping system of the invention is intrinsically safe and includes an interlocking arrangement so that the dump valve will not open when the reject chamber is pressurized. Failure can be further limited by employing a fluid cylinder unit that exerts a force insufficient to unseat the dump valve when the reject chamber is pressurized.

Other objects and advantages will appear during the course of the following description.

DESCRIPTION OF THE DRAWINGS

The drawings illustrate the best mode presently contemplated of carrying out the invention.

In the drawings:

FIG. 1 is a side elevation of a high density cleaner employing the dump valve construction of the invention;

FIG. 2 is an enlarged vertical section showing the attachment of the dump valve to the piston rod of the fluid cylinder unit;

FIG. 3 is a diagrammatic vertical section showing the dump valve in the closed position;

FIG. 4 is a view similar to FIG. 3 showing the dump valve in the open position; and FIG. 5 is a perspective view of a modified form of the dump valve.

DESCRIPTION OF THE ILLUSTRATED EMBODIMENT

FIG. 1 illustrates a conventional high density vortex or cyclone cleaner for removing high density particles or contaminants from cellulosic pulp. The cleaner includes a structural frame 1 which is generally box shaped in configuration and the lower end of a cleaning vessel 2 is supported on frame 1.

Cellulosic pulp, normally recycled pulp produced from old corrugated containers or office waste or newsprint, and having a consistency generally in the range of 2.5% to 5.5% solids is pumped at a pressure of about 40 to 60 psi into a tangential inlet 3 located at the upper end of the vessel 2. The tangential design converts the kinetic energy of the pulp into a rotating mass within the cleaning vessel. As the pulp rotates, shear planes are caused by acceleration of the pulp as it travels from the outside diameter of the vessel 2 radially inward toward the axis of rotation, where the pulp is diverted upwardly through the vortex and discharged through an outlet 4 in the upper end of vessel 2.

The shear planes act to strip the high density particles or contaminants from the pulp, and the extremely high centrifugal forces tend to drive the high density particles to the outside of the cleaning vessel. The high density particles then migrate downwardly along the inner surface of the vessel 2 into a reject vessel 5 which defines a reject chamber 6. Flow through the outlet at the lower end of vessel 2 into reject chamber 6 is controlled by a conventional sliding upper valve 7. To move valve 7 between an open and closed position, a cylinder 8 is mounted on frame 1, and the piston rod 9 of cylinder 8 is connected to one end of valve 7. Through operation of cylinder 8, valve 7 can be moved between the open and closed positions in a conventional manner.

A ring or annular member 10 is secured to the open lower end of reject vessel 5 by suitable screws or the like as best shown in FIG. 2. The inner peripheral surface of ring 10 defines a valve seat 11 which is engaged by a spherical ball valve 12. Valve seat 11 is formed with the contour of a portion of a sphere so that the valve seat will complement the peripheral surface of ball valve 12. As shown in FIG. 2, the outer surface of valve seat 11, as well as the surface of ring 10 facing the reject chamber 6, are preferably coated with a layer 13 of polymeric material, such as nylon or polytetrafluoroethylene, which provides a relatively resilient surface. Ball 12 is preferably formed of a metal such as stainless steel. Conversely, the ring 10 and valve seat 11 can be formed of a metal, such as stainless steel, and the ball valve 12 can be coated with a polymeric material, such as rubber or polyurethane.

A connecting rod or stem 14 is connected to ball valve 12 through a threaded connection or other connecting mechanism, and the lower end of stem 14 carries a slide 15 which can take the form of a ball that is mounted for movement in an axial recess 16 formed in the outer end of a piston rod 17 of a fluid cylinder 18. The bottom 19 of the recess 16 is rounded as shown in FIG. 2 to complement the peripheral contour of the slide 15. An annular cap 20 is threaded on the outer end of piston rod 17, and is provided with a central opening through which the stem 14 extends.

The attachment of piston rod 17 to stem 14 provides a lost-motion connection. With the valve 12 in the closed position, as shown in FIG. 2, initial upward movement of the piston rod 17 will move the slide 15 in recess 16 but will not correspondingly move the dump valve 12. When slide 15 bottoms out against the bottom 19 of recess 16, continued upward movement of the piston rod will then move the ball valve 12 upwardly away from the valve seat 11. The engagement of slide 15 with the bottom 19 of the recess provides an impact or jarring action which will aid in dislodging the large ball valve 12 from the valve seat. In addition, when the valve 12 is opened, the elongated stem 14 will be supported from the piston rod at spaced locations. More specifically, the stem will be supported through engagement of the slide 15 with the sides of the recess 16 as well as being supported by the engagement of the stem 14 within the opening in cap 20. This dual support will tend to keep the stem 14 which carries ball valve 12 from excessive tilting when the valve is opened, but will provide limited lateral movement to ensure that the ball will positively seat against the valve seat 11 when the valve is in the closed position.

A generally conical shield 21 is mounted on the piston rod above cap 20, and serves to deflect debris or contaminants away from the cap and piston rod 17 when the valve 12 is opened.

As shown in FIG. 1, a chute 22 can be attached to frame 1 to receive the contaminants being discharged through the open valve 12. A suitable seal 23 interconnects the piston rod with the bottom surface of chute 22 to permit the piston rod to slide relative to the chute.

A vent conduit 24 is connected to the upper end of reject chamber 6 and a valve 25 is mounted in conduit 24 to control the flow of fluid therethrough.

In addition, a flush line or conduit 26 is connected tangentially to the lower portion of reject chamber 6 and flushing water under pressure is introduced through the conduit 26 to flush pulp and contaminants from the reject chamber when the ball valve 12 is in the open position. Valve 27 is mounted in conduit 26 and controls the flow of water therethrough.

A conventional pressure sensor 28 is mounted in the wall of reject vessel 5 and is adapted to sense the pressure within the reject chamber 6.

In operation, the upper valve 7 is normally open and ball valve 12 and valves 25, 27 are closed. The pulp entering the inlet 3 will be swirled within the cleaning vessel 2, as previously described, with the high density contaminants migrating downwardly along the vessel wall through the open valve 7 into the reject chamber 6, while the pulp is discharged through the outlet 4 in the upper end of the vessel. Periodically, depending on the amount and type of contamination in the pulp, the collected rejects in reject chamber 6 are dumped or discharged. In practice, the dumping cycle can occur every 5 to 60 minutes.

To begin the dumping cycle, the upper valve 7 is closed and valve 25 in line 24 is opened to vent the pressure in the reject chamber 6. The cylinder 18 is then operated to move the ball valve 12 upwardly from seat 11 and as previously noted, the lost-motion connection between piston rod 17 and valve stem 14 provides a jarring action which aids in unseating valve 12. After valve 12 is opened, valve 27 in the flushing line 26 is opened to introduce pressurized flushing water tangentially into the reject chamber 6. This causes a violent swirling action to flush out the collected debris and pulp through the open valve seat 11 and into the chute 22.

After a preset time interval which will generally be in the range of about 30 to 45 seconds, ball valve 12 will close and its closed position is checked by a microswitch on the piston rod 17. The microswitch is connected in the control circuit for the upper valve 7 and valve 7 cannot open if the ball valve 12 is not fully or properly seated.

The flushing water from the conduit 26 removes air in the reject chamber through the open vent conduit 24 and pressurizes the chamber 6. The pressure sensor 28 will sense the pressure within the chamber 6 and when the selected pressure is achieved, valves 27 and 25 will close and upper valve 7 will open. Additional debris or contaminants will then be collected in the reject chamber 6 and the cycle is repeated.

FIG. 5 illustrates a modified form of the dump valve. The valve 29 as shown in FIG. 5 has a generally frusto-conical exterior surface, and the valve seat at the bottom of the reject chamber would have a similar contour to complement the exterior surface of valve 29. Valve 29 is secured to the upper end of a stem or connecting rod 30 similar to stem 14 of the first embodiment.

The upper surface 31 of valve 29 is domed shaped to prevent the debris from collecting on the upper surface of the valve. Alternately, the upper surface could be conical or have other non-planar contour, which would prevent the debris from collecting thereon. Valve 29 is operated in the manner described with respect to valve 12.

The vertically moving dump valve 12 or 29 of the invention eliminates the problems, such as excessive wear, valve packing and jam ups, associated with the sliding bottom dump valves as used in conventional high density cleaners.

When the dump valve of the invention is in the open, upper position, a large opening surrounding the valve exists to permit passage of debris from the rejection chamber. When the valve is in the closed position, the upper surface of the valve acts as a target to break the cyclone vortex and distribute the debris laterally in the reject chamber around the valve. As the upper surface of the valve is curved or non-planar, the debris will not collect on the upper surface of the valve.

Various modes of carrying out the invention are contemplated as being within the scope of the following claims particularly pointing out and distinctly claiming the subject matter which is regarded as the invention.

I claim:

1. An apparatus for removing high density contaminants from cellulosic pulp, comprising a cleaning vessel including an upper separating chamber and a lower reject chamber communicating with the lower end of the separating chamber, inlet means for introducing cellulosic pulp into said separating chamber, first outlet means for discharging cellulosic pulp from said separating chamber, means for swirling the pulp within the separating chamber to cause high density contaminants in said pulp to migrate downwardly from the separation chamber into said reject chamber, upper valve means located between the separating chamber and the reject chamber for controlling the flow of pulp therebetween, second outlet means disposed at the lower end of said reject chamber, lower valve means for controlling the flow through said second outlet means, said lower valve means including an annular valve seat bordering said second outlet means and having a downwardly converging sealing surface, said lower valve means also including a valve member disposed in the reject chamber and having a downwardly converging outer surface disposed to engage said valve seat and having a generally convex upper surface, and power operated drive means secured to said valve member and disposed outwardly of said reject chamber for moving said valve member from a closed to an open position and for moving said valve member from said open position to said closed position, said power operated drive means extending through said second outlet means and into said reject chamber when said valve member is in the open position.

2. The apparatus of claim 1, and including vent means communicating with said reject chamber for venting pressure from the reject chamber after closing of said upper valve means and prior to opening of said lower valve means.

3. The apparatus of claim 2, and including means for introducing flushing water into said reject chamber after said upper valve means is closed and said lower valve means is open to thereby flush rejected contaminants from said reject chamber.

4. The apparatus of claim 1, wherein said valve member is a spherical ball.

5. The apparatus of claim 1, wherein said valve member has a frusto-conical peripheral surface disposed to engage said seat.

6. The apparatus of claim 5, wherein the upper surface of said valve member is dome shaped.

7. The apparatus of claim 1, wherein said drive means comprises a fluid cylinder unit operably connected to a lower end of said valve member.

8. The apparatus of claim 7, wherein said fluid cylinder unit comprises a cylinder and piston means slidable relative to said cylinder and including a piston rod, said apparatus also including a stem connected to said valve member and connecting means operably connecting an outer end of said piston rod to said stem.

9. The apparatus of claim 8, wherein said connecting means includes a lost motion connection.

10. The apparatus of claim 9, wherein said lost-motion connection comprises an axial recess in said outer end of the piston rod, and a slide on the end of said stem and mounted for sliding movement in said recess, and retaining means on said piston rod to prevent displacement of said slide from said recess.

11. The apparatus of claim 10, wherein said slide comprises a ball.

12. An apparatus for removing high density contaminants from cellulosic pulp, comprising a vessel defining a separation chamber and a reject chamber connected to the lower end of said separation chamber, inlet means in the upper end of said separation chamber for introducing cellulosic pulp into said separation chamber, outlet means in the upper end of said separation chamber for discharging said pulp from said separation chamber, means for causing said pulp to swirl within said separation chamber to thereby separate high density contaminants from said pulp, said high density contaminants migrating downwardly from said separation chamber to said reject chamber and being collected therein, upper valve means located between the lower end of said separation chamber and said reject chamber for controlling the flow of material therebetween, an outlet in the lower end of the reject chamber, lower valve means for controlling the flow of contaminants through said outlet and including an annular valve seat bordering said outlet and a valve member disposed in the reject chamber to engage said valve seat, power operated fluid cylinder means located beneath said reject chamber and secured to the lower end of said valve member for moving said valve member in a vertical reciprocating path of movement between a closed position and an open position, said fluid cylinder means extending through said second outlet means and into said reject chamber when said valve member is in the open position, vent means communicating with the reject chamber for venting pressure from the reject chamber after closing of said upper valve means and prior to opening of said lower valve means, and means for introducing flushing water into said reject chamber after said upper valve means is closed and said lower valve means is open to flush said contaminants from said reject chamber.

13. The apparatus of claim 12, wherein said valve member is a ball and said valve seat has a partially spherical contour.

14. The apparatus of claim 12, wherein said fluid cylinder means includes a piston rod, an elongated connecting rod connected to said valve member, and a lost-motion connection connecting said piston rod and said connecting rod.

15. The apparatus of claim 14, wherein said lost-motion connection comprises an elongated axial recess in an outer end of the piston rod, a slide mounted on a distal end of said connecting rod and slidable within said recess, and retaining means on said piston rod to prevent displacement of said slide from said recess, initial outward movement of said piston rod acting to move said rod relative to said slide until said slide engages a bottom surface of said recess, and further outward movement of said piston rod acting to move said connecting rod upwardly and open said valve member.

16. The apparatus of claim 14, wherein one of said valve seat and said valve member is composed of metal and the other of said valve seat and said valve member is composed of a polymeric material softer than said metal.

17. The apparatus of claim 14, and including shield means mounted on said connecting rod for preventing contaminants being discharged from said reject chamber from contacting said piston rod.

* * * * *